(12) United States Patent
Wu

(10) Patent No.: US 11,178,719 B2
(45) Date of Patent: Nov. 16, 2021

(54) DEVICE AND METHOD OF HANDLING AN RADIO RESOURCE CONTROL RESUME PROCEDURE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 150 days.

(21) Appl. No.: 16/404,766

(22) Filed: May 7, 2019

(65) Prior Publication Data

US 2019/0342936 A1 Nov. 7, 2019

Related U.S. Application Data

(60) Provisional application No. 62/668,243, filed on May 7, 2018, provisional application No. 62/668,251, filed on May 7, 2018.

(51) Int. Cl.
*H04W 76/27* (2018.01)
*H04W 72/04* (2009.01)

(52) U.S. Cl.
CPC ......... *H04W 76/27* (2018.02); *H04W 72/042* (2013.01)

(58) Field of Classification Search
None
See application file for complete search history.

(56) References Cited

U.S. PATENT DOCUMENTS

| 2010/0035575 | A1* | 2/2010 | Wu | H04H 20/59 455/404.1 |
| 2012/0207130 | A1* | 8/2012 | Jang | H04W 8/24 370/331 |
| 2013/0039339 | A1* | 2/2013 | Rayavarapu | H04W 76/19 370/331 |
| 2015/0327139 | A1* | 11/2015 | Sirotkin | H04W 76/27 370/332 |
| 2016/0135095 | A1* | 5/2016 | Wu | H04W 36/0061 370/328 |
| 2016/0373967 | A1* | 12/2016 | Eklof | H04W 8/22 |

(Continued)

OTHER PUBLICATIONS

3GPP TS 38.331 V15.1.0, Mar. 2018.
(Continued)

*Primary Examiner* — Nicholas Sloms
(74) *Attorney, Agent, or Firm* — Winston Hsu

(57) ABSTRACT

A base station comprises instructions of: a first CU transmitting a UE CONTEXT SETUP REQUEST message comprising at least one first configuration, to a first DU, in response to an INITIAL UL RRC MESSAGE TRANSFER message comprising an RRC Resume Request message; the first CU receiving a UE CONTEXT SETUP RESPONSE message comprising at least one second configuration and a first full configuration indication, from the first DU; the first CU comprising a second full configuration indication in an RRC Resume message according to the first full configuration indication; the first CU transmitting the RRC Resume message comprising the at least one second configuration to a communication device via the first DU; the first DU communicating at least one of data and at least one signal with the communication device according to the at least one second configuration and not according to the at least one first configuration.

9 Claims, 10 Drawing Sheets

(56) References Cited

U.S. PATENT DOCUMENTS

| | | | |
|---|---|---|---|
| 2018/0110082 A1* | 4/2018 | Saily | H04W 74/0833 |
| 2018/0270713 A1* | 9/2018 | Park | H04W 28/18 |
| 2019/0014471 A1* | 1/2019 | Saily | H04W 12/04 |
| 2019/0059128 A1* | 2/2019 | Gage | H04W 52/0206 |
| 2019/0166576 A1* | 5/2019 | Kim | H04W 36/08 |
| 2019/0215887 A1* | 7/2019 | Burbidge | H04W 48/14 |
| 2019/0253937 A1* | 8/2019 | Hsieh | H04W 76/27 |
| 2019/0313244 A1* | 10/2019 | Wang | H04W 8/26 |
| 2020/0120477 A1* | 4/2020 | Mildh | H04W 8/08 |
| 2020/0120742 A1* | 4/2020 | Mildh | H04W 24/10 |
| 2020/0145878 A1* | 5/2020 | Jin | H04W 28/06 |
| 2020/0178209 A1* | 6/2020 | Jin | H04W 36/08 |
| 2020/0229049 A1* | 7/2020 | Wu | H04W 76/10 |

OTHER PUBLICATIONS

3GPP TS 38.473 V15.1.0 (Mar. 2018).
3GPP TS 38.470 V15.1.0 (Mar. 2018).
3GPP TS 38.300 V15.1.0 (Mar. 2018).
3GPP TS 36.331 V15.1.0 (Mar. 2018).
3GPP TSG-RAN WG2 Meeting #101bis R2-1806455 Sanya, China, Apr. 16-20, 2018, Apr. 2018.
3GPP TSG-RAN WG2 Meeting #101bis R2-1804849 Sanya, China, Apr. 16-20, 2018, Apr. 2018.
3GPP TSG-RAN3#99bis R3-181832 Sanya, China, Apr. 16-20, 2018, Apr. 2018.

* cited by examiner

DEVICE AND METHOD OF HANDLING AN RADIO RESOURCE CONTROL RESUME PROCEDURE

CROSS REFERENCE TO RELATED APPLICATIONS

This application claims the benefit of U.S. Provisional Applications No. 62/668,243, filed on May 7, 2018, and No. 62/668,251, filed on May 7, 2018, which are incorporated herein by reference.

BACKGROUND OF THE INVENTION

1. Field of the Invention

The present invention relates to a communication device and a method used in a wireless communication system, and more particularly, to a communication device and a method of handling an radio resource control resume procedure.

2. Description of the Prior Art

A user equipment (UE) in an radio resource control (RRC) CONNECTED state (RRC_CONNECTED) is configured with configuration(s) by a base station (BS) and the UE stores the configuration(s) when entering an RCC INACTIVE state (RRC_INACTIVE) from the RCC_CONNECTED. The UE in the RCC_INACTIVE performs an RRC Resume procedure with the BS to enter the RCC_CONNECTED. Thus, how to handle the configuration(s) regarding the RRC Resume procedure is an important problem to be solved.

SUMMARY OF THE INVENTION

The present invention therefore provides a method and related communication device for handling an radio resource control resume procedure to solve the abovementioned problem.

A base station comprising a first Centralized Unit (CU) and a first Distributed Unit (DU) for handling an radio resource control (RRC) Resume procedure comprises at least one storage device and at least one processing circuit, coupled to the at least one storage device. The at least one storage device stores instructions, and the at least one processing circuit is configured to execute the instructions of: the first CU receiving an INITIAL uplink (UL) RRC MESSAGE TRANSFER message from the first DU, wherein the INITIAL UL RRC MESSAGE TRANSFER message comprises an RRC Resume Request message; the first CU transmitting a user equipment (UE) CONTEXT SETUP REQUEST message to the first DU in response to the INITIAL UL RRC MESSAGE TRANSFER message, wherein the UE CONTEXT SETUP REQUEST message comprises at least one first configuration; the first CU receiving a UE CONTEXT SETUP RESPONSE message for responding to the UE CONTEXT SETUP REQUEST message, from the first DU, wherein the UE CONTEXT SETUP RESPONSE message comprises at least one second configuration and a first full configuration indication; the first CU comprising a second full configuration indication in an RRC Resume message according to the first full configuration indication; the first CU transmitting the RRC Resume message comprising the at least one second configuration, to a communication device via the first DU; and the first DU communicating at least one of data and at least one signal with the communication device according to the at least one second configuration and not according to the at least one first configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
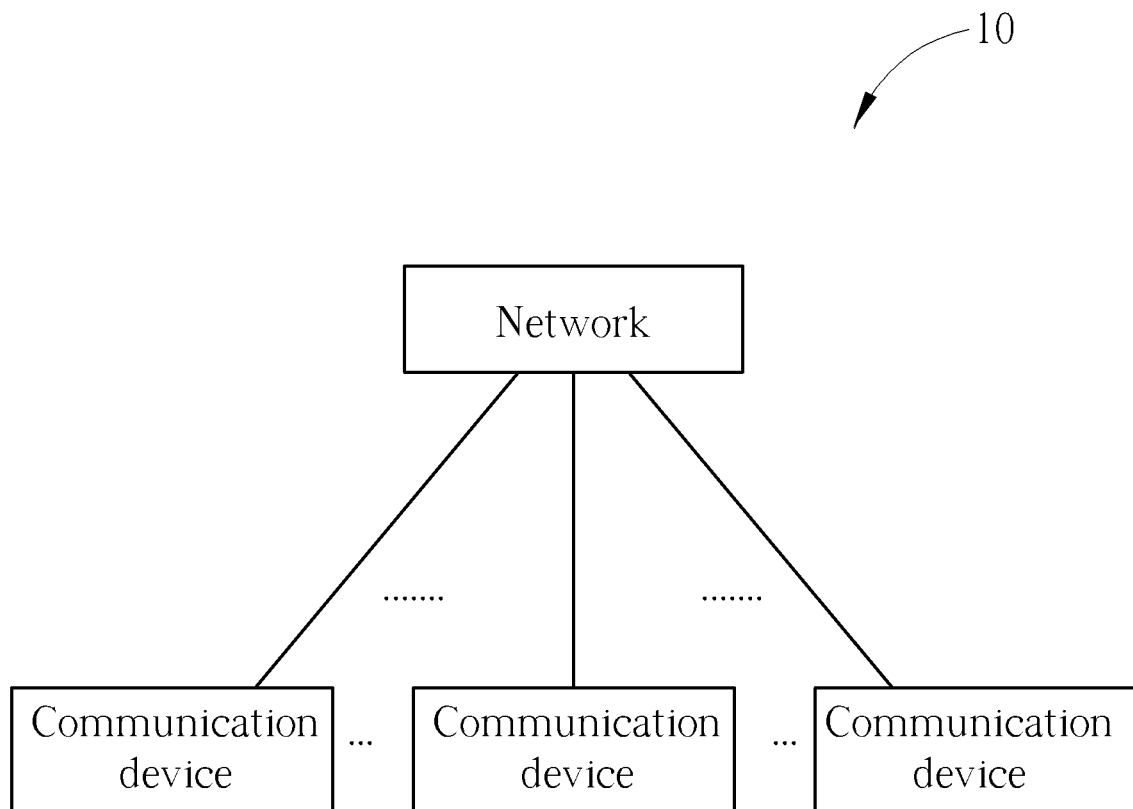
FIG. 1 is a schematic diagram of a wireless communication system according to an example of the present invention.

In FIG. 1, the wireless communication system 10 is briefly composed of a network and a plurality of communication devices. The network and the communication devices are simply utilized for illustrating the structure of the wireless communication system 10. The network and the communication devices communicate with each other via at least one carrier. The network and the communication device communicate with each other via one or multiple cells (e.g., multiple carriers) belonging to one or multiple base stations (BSs).

In some implementations, the network includes a Fifth Generation (5G) (or called New Radio (NR)) Radio Access Network (RAN) and a 5G Core (5GC). The 5G RAN may include at least one 5G BS (or called gNB). The 5G BS includes at least one Centralized Unit (CU) (or called gNB-CU) and at least one Distributed Unit (DU) (or called gNB-DU). The DU (s) connects to the CU (s), e.g., via an interface (e.g., F1 interface). The communication devices communicate (e.g., transmit or receive) with the CU(s) via the DU(s).

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
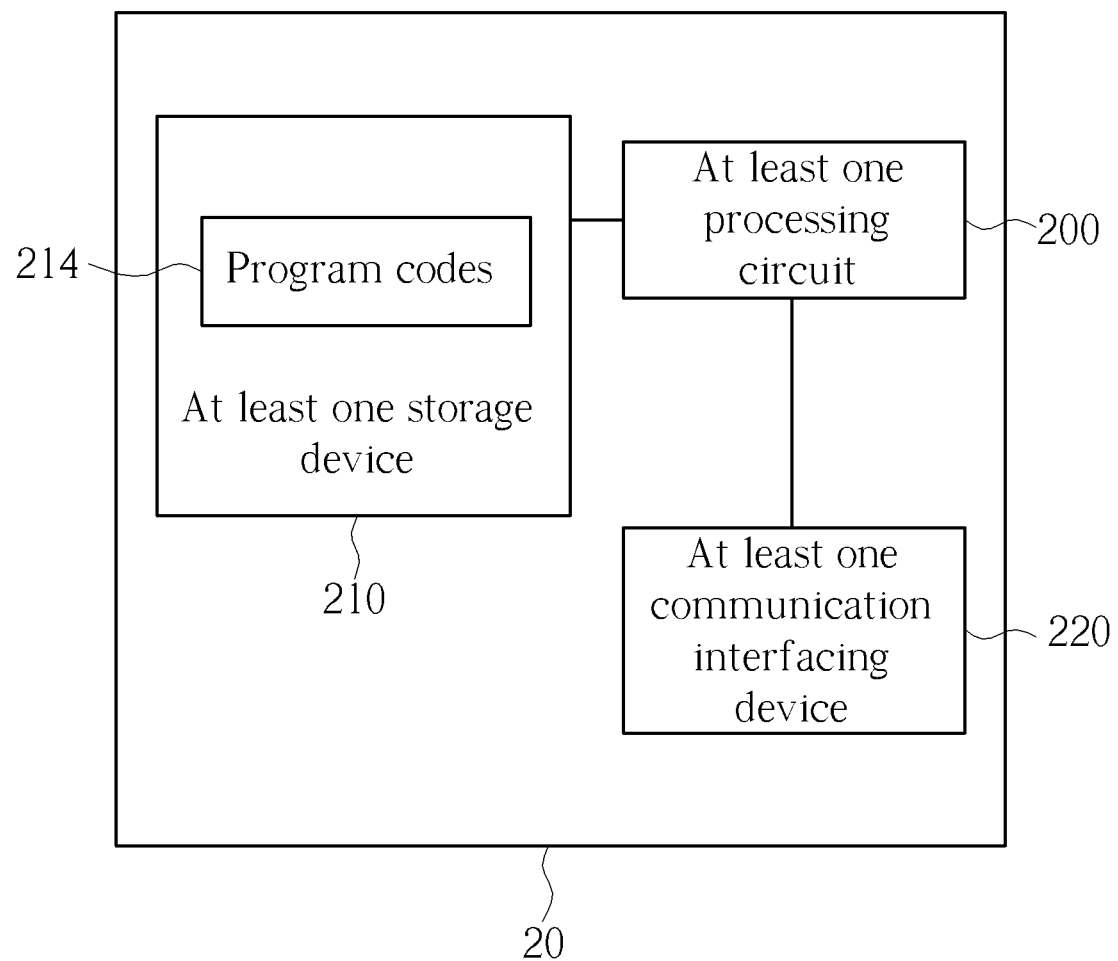
FIG. 2 is a schematic diagram of a communication device according to an example of the present invention.

In FIG. 2, the communication device 20 may be a communication device or the network shown in FIG. 1, but is not limited herein. The communication device 20 includes at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
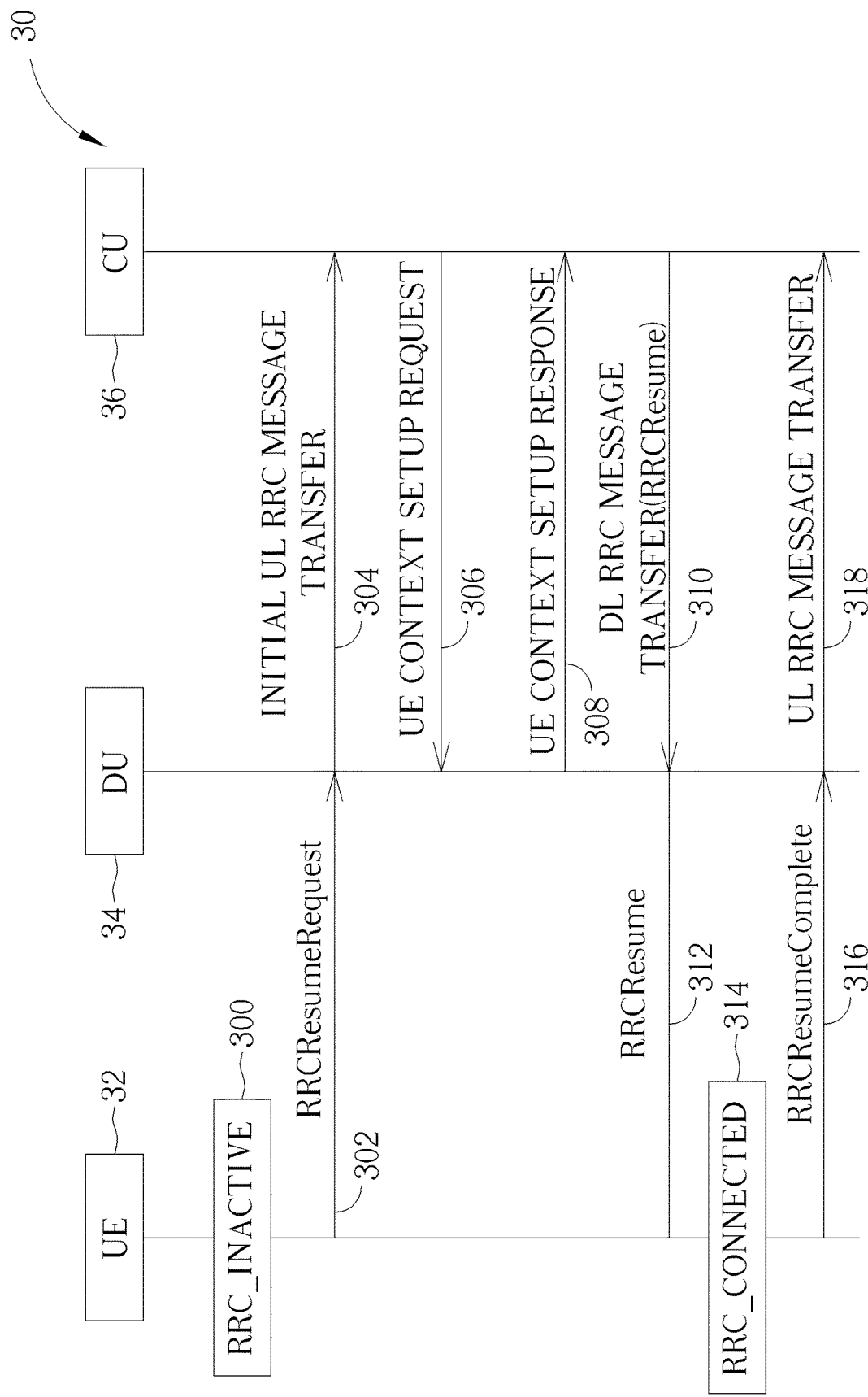
FIG. 3 is a procedure of an radio resource control resume procedure according to an example of the present invention.

FIG. 3 is a schematic diagram of an RRC Resume procedure 30 according to an example of the present invention. Operations of a UE 32, a DU 34 and a CU 36 (e.g., in the 5G BS of the network in FIG. 1) in FIG. 3 are described as follows. The UE 32 enters (or is in) an RCC INACTIVE state (RCC_INACTIVE) (Step 300). The UE 32 transmits an RRC Resume Request (RRCResumeRequest) message to the DU 34 (Step 302). The DU 34 transmits an INITIAL UL RRC MESSAGE TRANSFER message to the CU 36 (Step 304). The CU 36 transmits a UE CONTEXT SETUP REQUEST message to the DU 34 (Step 306). The DU 34 transmits a UE CONTEXT SETUP RESPONSE message to the CU 36 (Step 308). The CU 36 transmits a DL RRC MESSAGE TRANSFER message including an RRC Resume (RRCResume) message to the DU 34 (Step 310). The DU 34 transmits the RRCResume message to the UE 32 (Step 312). The UE 32 enters an RCC CONNECTED state (RCC_CONNECTED) from the RCC_INACTIVE (Step 314). The UE 32 transmits an RRC Resume Complete (RRCResumeComplete) message to the DU 34 (Step 316). The DU 34 transmits a UL RRC MESSAGE TRANSFER message to the CU 36 (Step 318).

Figure 4:
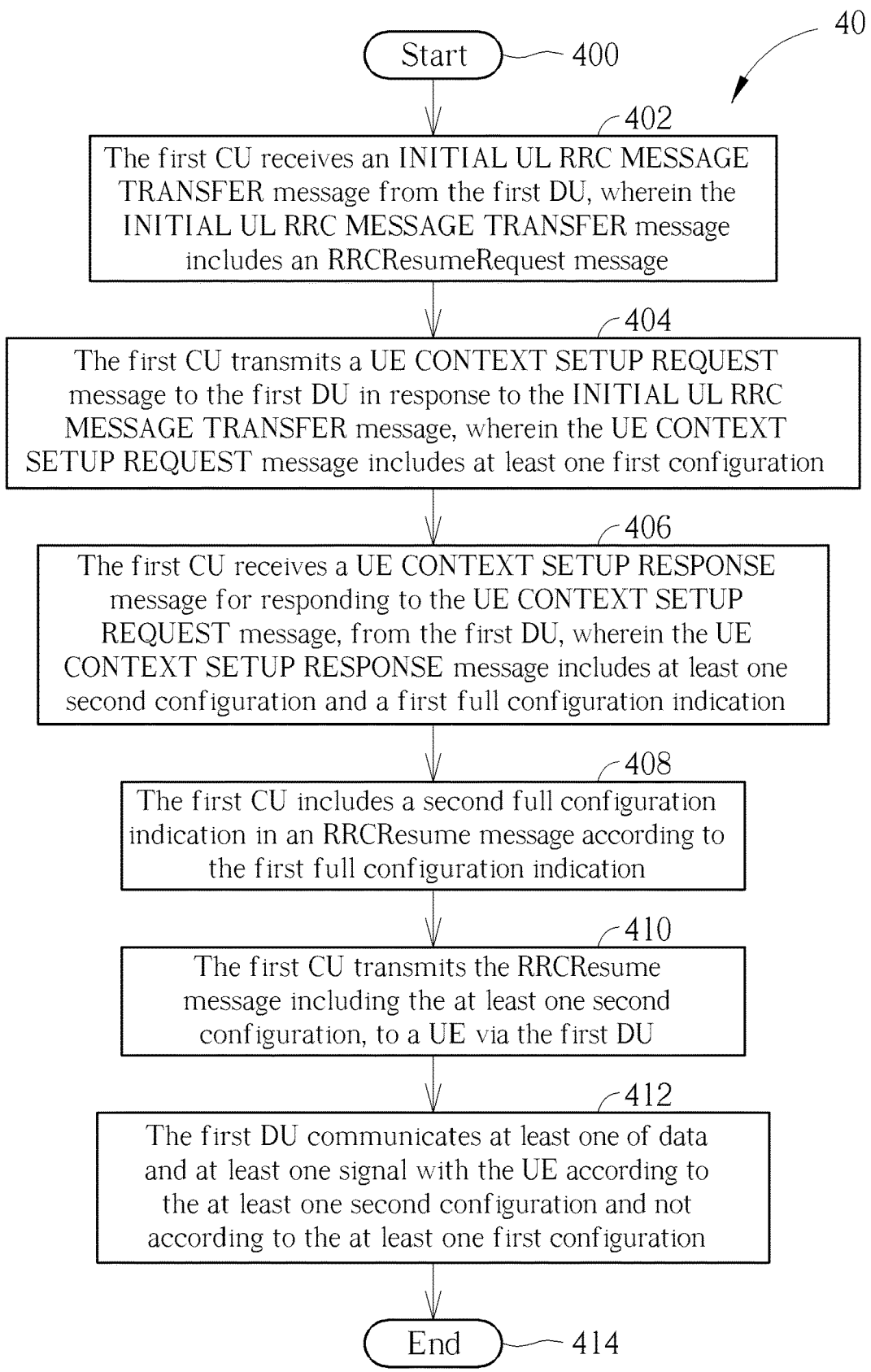
FIG. 4 is a flowchart of a process according to an example of the present invention.

A process 40 in FIG. 4 is utilized in a first CU and a first DU (e.g., in the 5G BS of the network in FIG. 1), and includes the following steps:

Step 400: Start.

Step 402: The first CU receives an INITIAL UL RRC MESSAGE TRANSFER message from the first DU, wherein the INITIAL UL RRC MESSAGE TRANSFER message includes an RRCResumeRequest message.

Step 404: The first CU transmits a UE CONTEXT SETUP REQUEST message to the first DU in response to the INITIAL UL RRC MESSAGE TRANSFER message, wherein the UE CONTEXT SETUP REQUEST message includes at least one first configuration.

Step 406: The first CU receives a UE CONTEXT SETUP RESPONSE message for responding to the UE CONTEXT SETUP REQUEST message, from the first DU, wherein the UE CONTEXT SETUP RESPONSE message includes at least one second configuration and a first full configuration indication.

Step 408: The first CU includes a second full configuration indication in an RRCResume message according to the first full configuration indication.

Step 410: The first CU transmits the RRCResume message including the at least one second configuration, to a UE via the first DU.

Step 412: The first DU communicates (e.g., transmits or receives) at least one of data and at least one signal with (e.g., to or from) the UE according to (e.g., by using) the at least one second configuration and not according to (e.g., by not using or without considering) the at least one first configuration.

Step 414: End.

In one example, the UE communicates (e.g., transmits or receives) the at least one of the data and the at least one signal with the first DU according to (e.g., by using) the at least one second configuration and not according to (e.g., by not using or without considering) the at least one first configuration, in response to the RRCResume message or the second full configuration indication. That is, the UE determines not to use the at least one first configuration according to the second full configuration indication.

In one example, the UE releases (e.g., all of) the at least one first configuration in response to the second full configuration indication.

In one example, the data includes at least one protocol data unit (PDU). In one example, one of the at least one PDU is a Packet Data Convergence Protocol (PDCP) PDU. The first DU may receive the PDCP PDU from the first CU.

In one example, one of the at least one PDU is a Radio Link Control (RLC) PDU or a Medium Access Control (MAC) PDU. The RLC PDU or the MAC PDU may include a PDCP PDU received from the first CU. The first CU transmits the PDCP PDU to the first DU according to a radio bearer configuration (RadioBearerConfig) or a PDCP configuration, and the first DU transmits the RLC PDU or the MAC PDU to the UE according to (e.g., by using) the at least one second configuration and not according to (e.g., by using) the at least one first configuration.

In one example, the first CU transmits the RadioBearerConfig or the PDCP configuration to the UE in the RRCResume message. In this case, the UE replaces the previously received RadioBearerConfig or PDCP configuration with the (e.g., currently received) RadioBearerConfig or the PDCP configuration in response to the second full configuration indication.

In one example, the UE transmits one PDU of the at least one PDU to the first DU according to (e.g., by using) at least one configuration of the at least one second configuration, and transmits one of the at least one signal to the first DU according to (e.g., by using) at least one configuration of the at least one second configuration.

In one example, one of the at least one PDU is a RLC PDU or a MAC PDU. The RLC PDU or the MAC PDU may include a PDCP PDU. The UE may generate the PDCP PDU according to the RadioBearerConfig or the PDCP configuration. The UE transmits the RLC PDU or the MAC PDU to the first DU according to (e.g., by using) the at least one second configuration and not according to (e.g., by using) the at least one first configuration. The first DU may transmit the PDCP PDU to the first CU.

In one example, the UE receives one of the at least one PDU from the first DU according to (e.g., by using) at least one configuration of the at least one second configuration, and receive one of the at least one signal according to (e.g., by using) at least one configuration of the at least one second configuration.

In one example, the at least one first configuration is included in a first cell group configuration (CellGroupConfig), and the at least one second configuration is included in a second CellGroupConfig. In one example, the at least one first configuration includes a first CellGroupConfig, and the at least one second configuration includes a second CellGroupConfig.

In one example, if the UE CONTEXT SETUP RESPONSE message does not include the first full configuration indication, and includes or does not include a delta configuration indication, the first CU does not include the second full configuration indication in the RRCResume message. In this case, the first DU communicates the at least one of the data or the at least one signal with the UE according to (e.g., by using) the at least one first configuration and the at least one second configuration. The UE communicates the at least one of the data or the at least one signal with the first DU according to (e.g., by using) the at least one first configuration and the at least one second configuration.

In one example, "not according to the at least one first configuration" is replaced with "not according to all of the at least one first configuration".

In one example, the first CU determines not to or does not include the at least one first configuration in the UE CONTEXT SETUP REQUEST message, if the first CU or the first DU does not support a feature of a delta configuration. Otherwise, the first CU includes the at least one first configuration in the UE CONTEXT SETUP REQUEST message. In this case, the first DU may or may not include the first full configuration indication in the UE CONTEXT SETUP RESPONSE message. If the first full configuration indication is not included in the UE CONTEXT SETUP RESPONSE message, the first CU (e.g., still) includes the second full configuration indication in the RRCResume message.

In one example, the first full configuration indication is not needed, if the second full configuration indication is included in the at least one second configuration. In this case, the second full configuration indication is included in the RRCResume message (e.g., automatically), when the RRCResume message includes the at least one second configuration.

Figure 5:
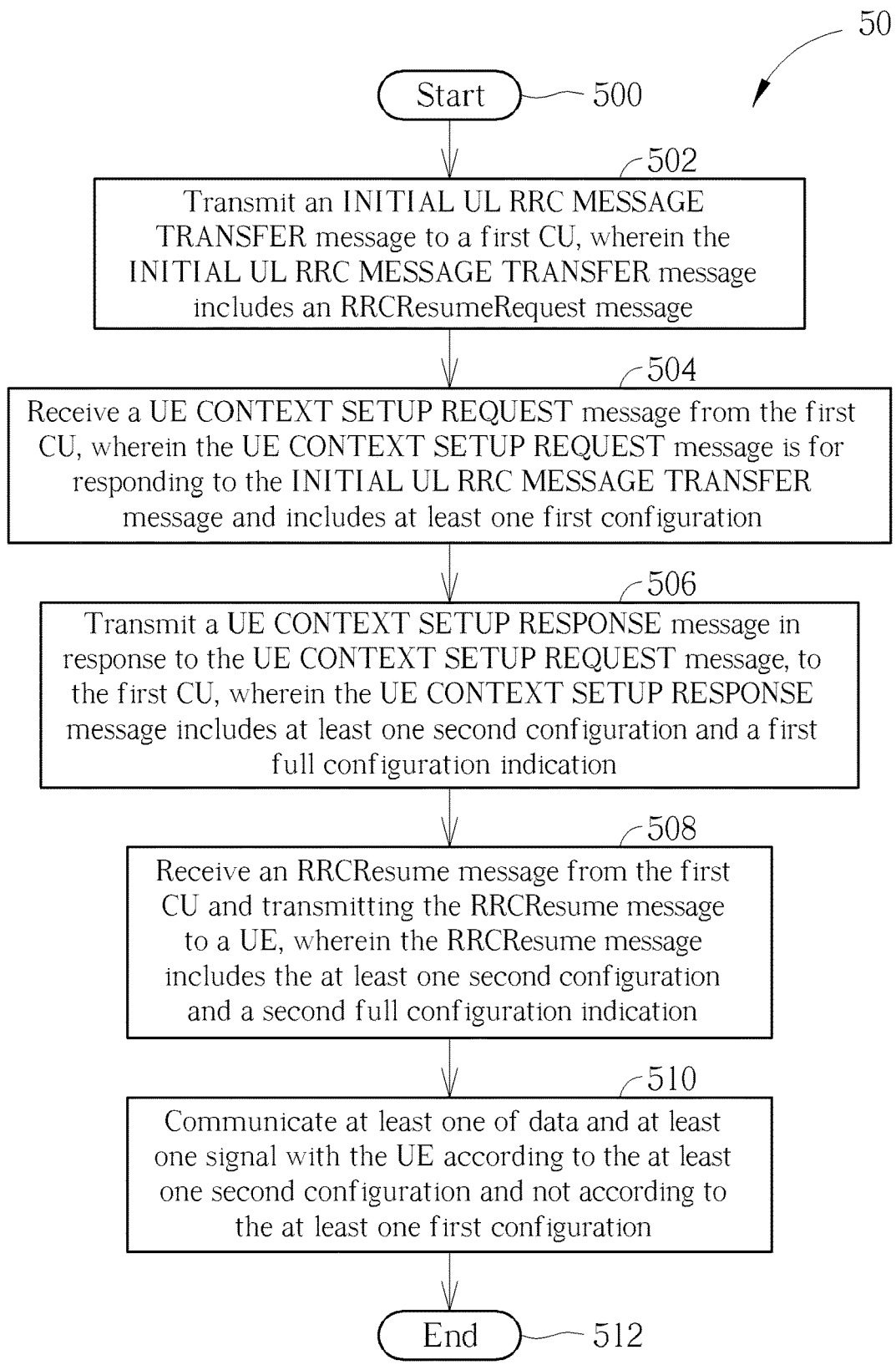
FIG. 5 is a flowchart of a process according to an example of the present invention.

Process 40 may be rewritten as a process 50 in FIG. 5, which is utilized in a first DU (e.g., the first DU described in the process 40), and includes the following steps:

Step 500: Start.

Step 502: Transmit an INITIAL UL RRC MESSAGE TRANSFER message to a first CU (e.g., the first CU described in the process 40), wherein the INITIAL UL RRC MESSAGE TRANSFER message includes an RRCResumeRequest message.

Step 504: Receive a UE CONTEXT SETUP REQUEST message from the first CU, wherein the UE CONTEXT SETUP REQUEST message is for responding to the INITIAL UL RRC MESSAGE TRANSFER message and includes at least one first configuration.

Step 506: Transmit a UE CONTEXT SETUP RESPONSE message in response to the UE CONTEXT SETUP REQUEST message, to the first CU, wherein the UE CONTEXT SETUP RESPONSE message includes at least one second configuration and a first full configuration indication.

Step 508: Receive an RRCResume message from the first CU and transmitting the RRCResume message to a UE, wherein the RRCResume message includes the at least one second configuration and a second full configuration indication.

Step 510: Communicate (e.g., transmit or receive) at least one of data and at least one signal with (e.g., to or from) the UE according to (e.g., by using) the at least one second configuration and not according to (e.g., by not using or without considering) the at least one first configuration.

Step 512: End.

Description for the process 40 can be applied to the process 50.

Figure 6:
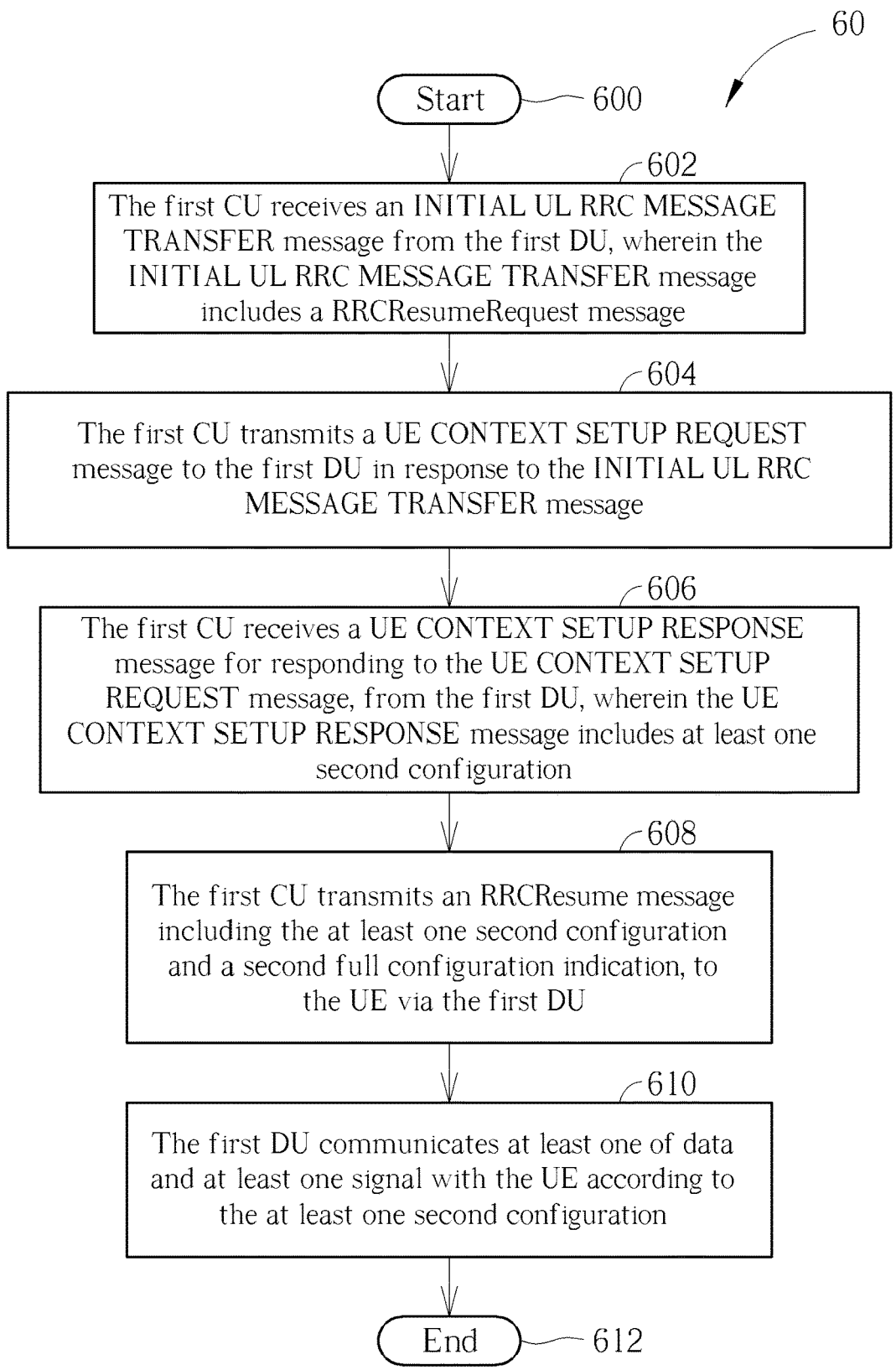
FIG. 6 is a flowchart of a process according to an example of the present invention.

A process 60 in FIG. 6 is utilized in a first CU and a first DU (e.g., in the 5G BS of the network in FIG. 1), and includes the following steps:

Step 600: Start.

Step 602: Same as Step 402.

Step 604: The first CU transmits a UE CONTEXT SETUP REQUEST message to the first DU in response to the INITIAL UL RRC MESSAGE TRANSFER message.

Step 606: The first CU receives a UE CONTEXT SETUP RESPONSE message for responding to the UE CONTEXT SETUP REQUEST message, from the first DU, wherein the UE CONTEXT SETUP RESPONSE message includes at least one second configuration.

Step 608: The first CU transmits an RRCResume message including the at least one second configuration and a second full configuration indication, to the UE via the first DU.

Step 610: The first DU communicates (e.g., transmits or receives) at least one of data and at least one signal with (e.g., to or from) the UE according to (e.g., by using) the at least one second configuration.

Step 612: End.

According to the process 60, the first CU determines to include the second full configuration indication in the RRCResume message.

In one example, the UE CONTEXT SETUP REQUEST message includes or does not include at least one first configuration. The first DU communicates the at least one of the data and the at least one signal with the UE according to the at least one second configuration and not according to (e.g., by using or without considering) the at least one first configuration. The first CU determines to include the second full configuration indication in the RRCResume message irrespective of (e.g., without considering) the at least one first configuration.

Description for the process 40 can be applied to the process 60.

Figure 7:
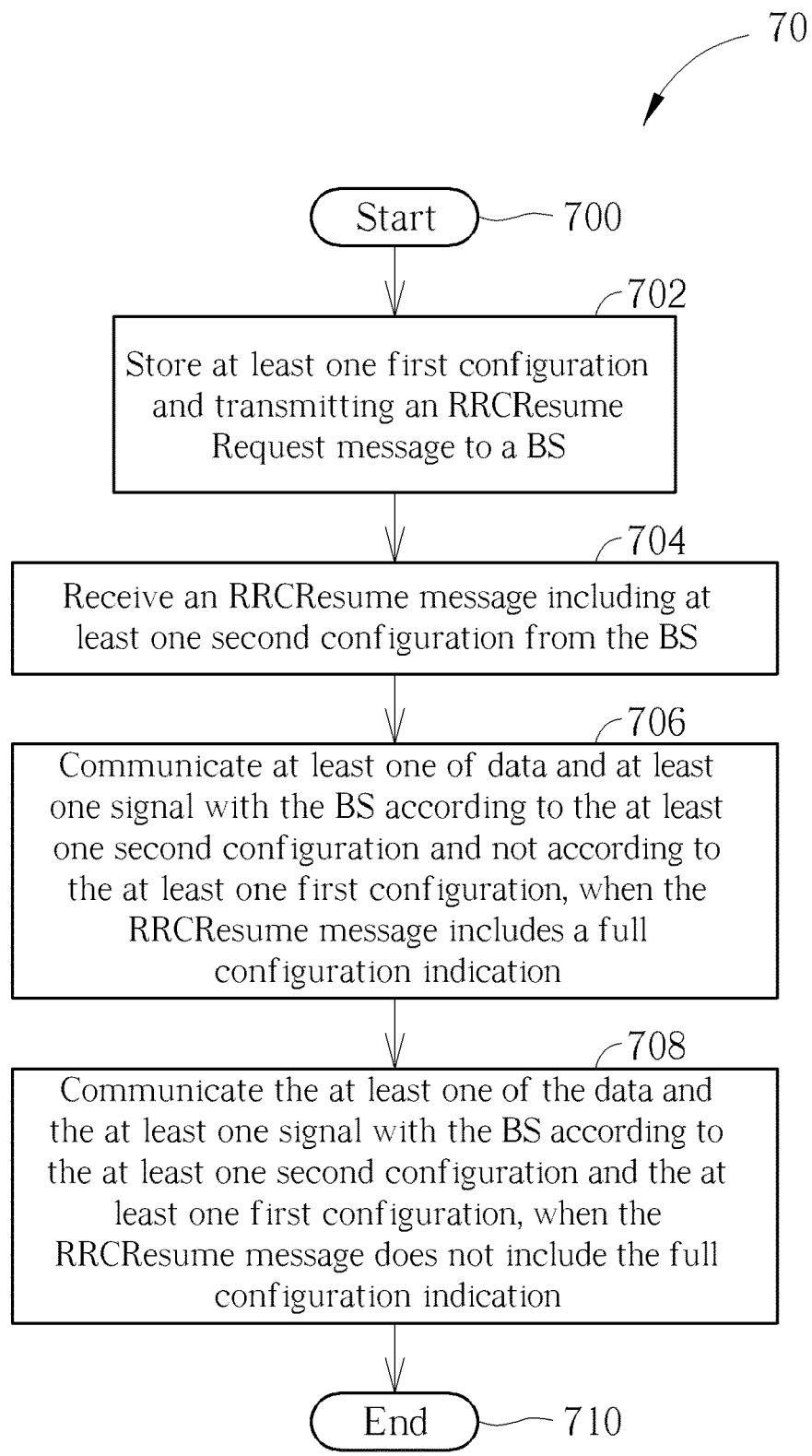
FIG. 7 is a flowchart of a process according to an example of the present invention.

A process 70 in FIG. 7 is utilized in a UE (e.g., the UE described in the process 40), and includes the following steps:

Step 700: Start.

Step 702: Store (or keep or maintain) at least one first configuration and transmitting an RRCResume Request message to a BS (e.g., of the network in FIG. 1).

Step 704: Receive an RRCResume message including at least one second configuration from the BS.

Step 706: Communicate (e.g., transmit or receive) at least one of data and at least one signal with (e.g., to or from) the BS according to (e.g., by using) the at least one second configuration and not according to (e.g., by not using or without considering) the at least one first configuration, when the RRCResume message includes a full configuration indication.

Step 708: Communicate (e.g., transmit or receive) the at least one of the data and the at least one signal with (e.g., to or from) the BS according to (e.g., by using) the at least one second configuration and the at least one first configuration, when the RRCResume message does not include the full configuration indication.

Step 710: End.

In one example, the UE releases the at least one first configuration in response to the full configuration indication, and enters an RCC_CONNECTED in response to the RRCResume message. In one example, the BS includes (e.g., is) at least one of a first CU and a first DU (e.g., the first CU and the first DU described in the process 40).

Description for the process 40 can be applied to the process 70. The full configuration indication described in the process 70 may be the second full configuration indication described in the process 40.

Figure 8:
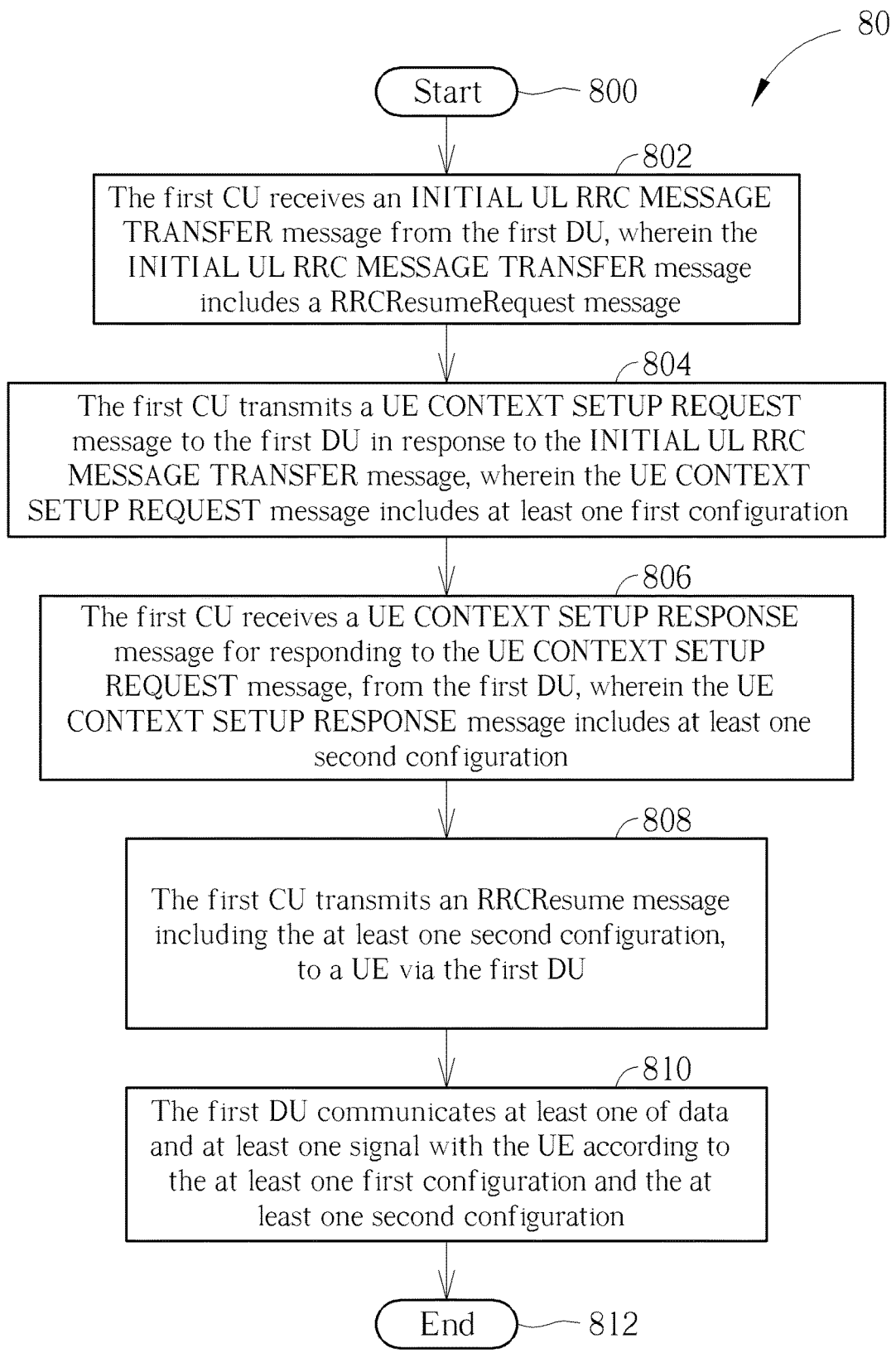
FIG. 8 is a flowchart of a process according to an example of the present invention.

A process 80 in FIG. 8 is utilized in a first CU and a first DU (e.g., in the 5G BS of the network in FIG. 1), and includes the following steps:

Step 800: Start.

Steps 802-804: Same as Steps 402-404.

Step 806: Same as Step 606.

Step 808: The first CU transmits an RRCResume message including the at least one second configuration, to a UE via the first DU.

Step 810: The first DU communicates (e.g., transmits or receives) at least one of data and at least one signal with (e.g., to or from) the UE according to (e.g., by using) the at least one first configuration and the at least one second configuration.

Step 812: End.

In one example, the UE communicates (e.g., transmits or receives) the data or the at least one signal with (e.g., to or from) the first DU according to (e.g., by using) the at least one second configuration and according to (e.g., by using) the at least one first configuration, in response to the RRCResume message.

In one example, the data includes at least one PDU. In one example, one of the at least one PDU is a PDCP PDU. The first DU may receive the PDCP PDU from the first CU.

In one example, one of the at least one PDU is a RLC PDU or a MAC PDU. The RLC PDU or the MAC PDU includes a PDCP PDU received from the first CU. The first CU transmits the PDCP PDU to the first DU according to a RadioBearerConfig or a PDCP configuration, and the first DU transmits the RLC PDU or the MAC PDU to the UE according to (e.g., by using) at least one of the at least one first configuration and the at least one second configuration.

In one example, the UE transmits one PDU of the at least one PDU to the first DU according to (e.g., by using) the at least one first configuration, and transmits one of the at least one signal to the first DU according to (e.g., by using) the at least one second configuration.

In one example, one of the at least one PDU is a RLC PDU or a MAC PDU. The RLC PDU or the MAC PDU includes a PDCP PDU. The UE generates the PDCP PDU according to the RadioBearerConfig or the PDCP configuration. The UE transmits the RLC PDU or the MAC PDU to the first DU according to (e.g., by using) the at least one first configuration. The first DU transmits the PDCP PDU to the first CU.

In one example, the UE receives one of the at least one PDU from the first DU according to (e.g., by using) the at least one first configuration, and receives one of the at least one signal according to (e.g., by using) the at least one second configuration.

In one example, the at least one first configuration does not include one of the at least one second configuration. In one example, one of the at least one first configuration and one of the at least one second configuration are the same configuration with different values.

In one example, the at least one first configuration is included in a first cell group configuration (CellGroupConfig), and the at least one second configuration is included in a second CellGroupConfig. In one example, the at least one first configuration includes a first CellGroupConfig, and the at least one second configuration includes a second CellGroupConfig.

In one example, the UE CONTEXT SETUP RESPONSE message, the at least one second configuration or the second CellGroupconfig includes or does not include an indication indicating that the at least one second configuration includes delta configuration(s) compared to the at least one first configuration. If (e.g., in the case that) the indication is not included, the UE CONTEXT SETUP RESPONSE message, the at least one second configuration or the second CellGroupconfig may (e.g., implicitly) indicate that the at least one second configuration include delta configuration(s) compared to the at least one first configuration and the first CU does not include a full configuration indication in the RRCResume message. If (e.g., in the case that) the indication is included in the UE CONTEXT SETUP RESPONSE message, the first CU does not include a full configuration indication in the RRCResume message.

In one example, if the UE CONTEXT SETUP RESPONSE message includes an indication indicating that the at least one second configuration includes full configuration(s), the first CU includes a full configuration indication in the RRCResume message. In this case, the first DU communicates the at least one of the data or the at least one signal with the UE according to (e.g., by using) the at least one second configuration and not according to (e.g., by not using or without considering) the at least one first configuration. The UE communicates the data or signal (s) with the first DU according to (e.g., by using) the at least one second configuration and not according to (e.g., by not using or without considering) the at least one first configuration.

Figure 9:
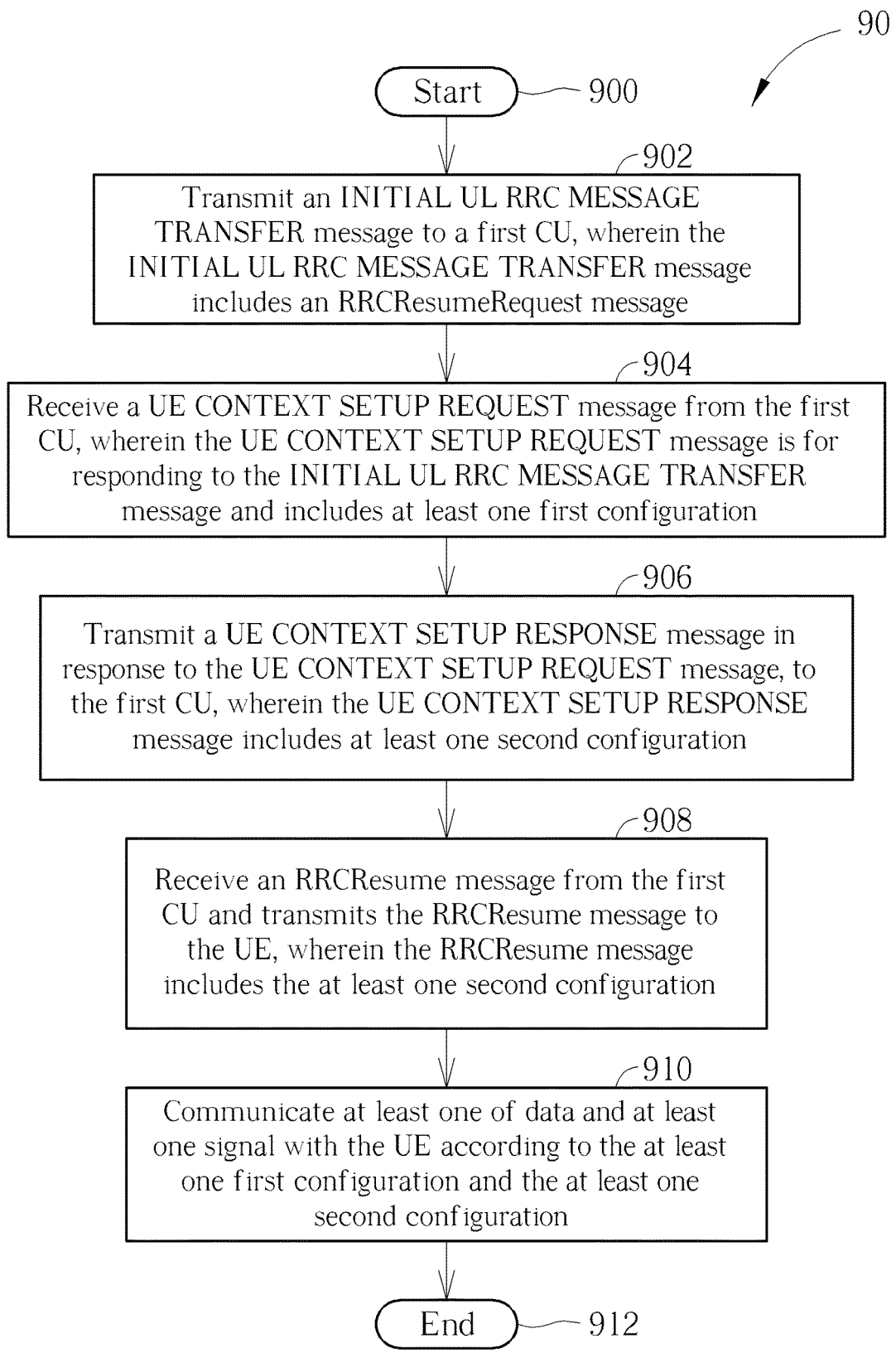
FIG. 9 is a flowchart of a process according to an example of the present invention.

Process 80 may be rewritten as a process 90 in FIG. 9, which is utilized in a first DU (e.g., the first DU described in the process 80), and includes the following steps:

Step 900: Start.

Steps 902-904: Same as Steps 502-504.

Step 906: Transmit a UE CONTEXT SETUP RESPONSE message in response to the UE CONTEXT SETUP REQUEST message, to the first CU, wherein the UE CONTEXT SETUP RESPONSE message includes at least one second configuration.

Step 908: Receive an RRCResume message from the first CU and transmits the RRCResume message to the UE, wherein the RRCResume message includes the at least one second configuration.

Step 910: Communicate (e.g., transmit or receive) at least one of data and at least one signal with (e.g., to or from) the UE according to (e.g., by using) the at least one first configuration and the at least one second configuration.

Step 912: End.

Description for the process 80 can be applied to the process 90.

Figure 10:
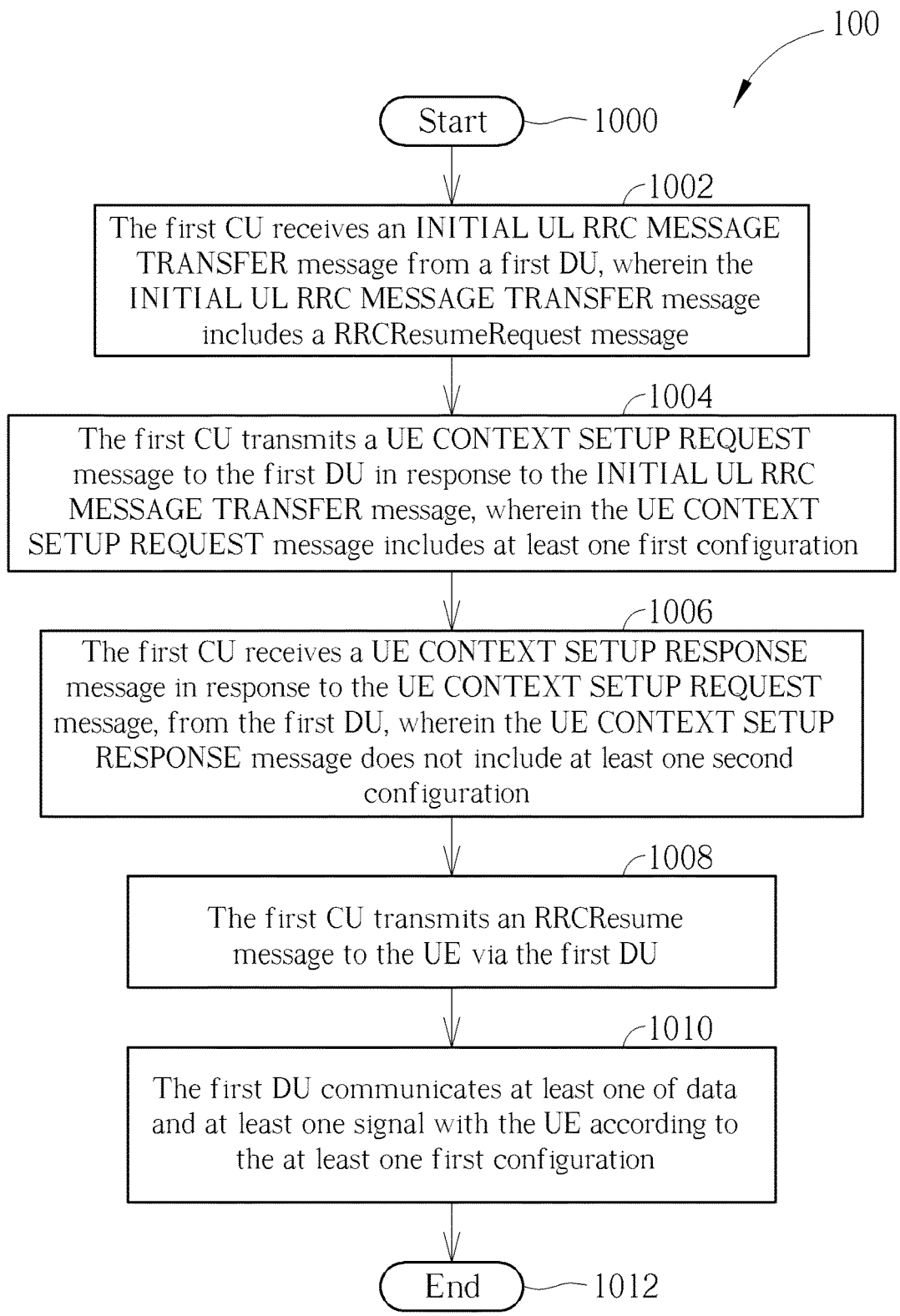
FIG. 10 is a flowchart of a process according to an example of the present invention.

A process 100 in FIG. 10 is utilized in a first CU and a first DU (e.g., in the 5G BS of the network in FIG. 1), and includes the following steps:

Step 1000: Start.

Steps 1002-1004: Same as Steps 402-404.

Step 1006: The first CU receives a UE CONTEXT SETUP RESPONSE message in response to the UE CONTEXT SETUP REQUEST message, from the first DU, wherein the UE CONTEXT SETUP RESPONSE message does not include at least one second configuration.

Step 1008: The first CU transmits an RRCResume message to the UE via the first DU.

Step 1010: The first DU communicates (e.g., transmits or receives) at least one of data and at least one signal with (e.g., to or from) the UE according to (e.g., by using) the at least one first configuration.

Step 1012: End.

According to process 100, the first DU determines to reuse the at least one first configuration. Thus, the first DU does not include the at least one second configuration in the UE CONTEXT SETUP RESPONSE message.

The following examples may be applied to the procedure 30 and the processes 40-100.

In one example, the first DU receives the RRCResumeRequest from the UE.

In one example, the first CU transmits a DL RRC MESSAGE TRANSFER message including the RRCResume message to the first DU, and the first DU transmits the RRCResume message to the UE. In one example, the first DU receives an RRCResumeComplete message for responding to the RRCResume message, from the UE, and the first DU transmits a UL RRC MESSAGE TRANSFER message including the RRCResumeComplete message to the first CU.

In one example, the first CU receives the at least one first configuration from a second DU of the BS, before receiving the RRCResumeRequest message. The first CU determines to configure the UE to enter an RCC_INACTIVE. The first CU stores (or keeps or maintains) the at least one first configuration in response to the determination. The first CU transmits a UE CONTEXT RELEASE COMMAND message to the second DU in response to the determination. The second DU releases the at least one first configuration and transmits a UE CONTEXT RELEASE COMPLETE message to the first CU, in response to the UE CONTEXT RELEASE COMMAND message.

In one example, the first CU receives the at least one first configuration from a second CU of the BS. For example, the first CU transmits a RETRIEVE UE CONTEXT REQUEST message to the second CU in response to the RRCResumeRequest message. The first CU receives a RETRIEVE UE CONTEXT RESPONSE message for responding to the RETRIEVE UE CONTEXT REQUEST message from the second CU. The RETRIEVE UE CONTEXT RESPONSE message includes the at least one first configuration.

In one example, the UE (e.g., in an RCC_CONNECTED) receives the at least one first configuration from the first CU or the second CU (e.g., in at least one RRC Reconfiguration (RRCReconfiguration) message from the first CU or the second CU), before transmitting the RRCResumeRequest or before entering the RCC_INACTIVE.

In one example, the first DU and the second DU are the same DU or different DUs.

In one example, the at least one signal includes at least one of a Hybrid Automatic Repeat Request (HARQ) acknowledgement (ACK), a HARQ negative ACK, Channel State Information (CSI), a Channel Quality Indicator (CQI), a Sounding Reference Signal (RS), DL Control Information (DCI), a Scheduling Request, a Random Access Preamble, a CSI-RS, a Physical DL Share Channel (PDSCH) transmission and a Physical UL Share Channel (PUSCH) transmission.

In one example, the first CU transmits the RadioBearerConfig or the PDCP configuration to the UE in the at least one RRCReconfiguration message. In another example, the second CU transmits the RadioBearerConfig or the PDCP configuration to the UE in the at least one RRCReconfiguration message, and the first CU receives the RadioBearerConfig or the PDCP configuration from the second CU. For example, the first CU transmits a RETRIEVE UE CONTEXT REQUEST message to the second CU in response to the RRCResumeRequest. The first CU receives a RETRIEVE UE CONTEXT RESPONSE message for responding to the RETRIEVE UE CONTEXT REQUEST message from the second CU. The RETRIEVE UE CONTEXT RESPONSE message includes the RadioBearerConfig or the PDCP configuration.

In one example, one of the at least one PDU is a PDCP PDU. The UE transmits the PDCP PDU to the first CU via the first DU, according to the RadioBearerConfig or the PDCP configuration. In one example, the PDCP PDU includes the RRCResumeComplete message, a Service Data Adaptation Protocol (SDAP) PDU or an Internet Protocol (IP) packet.

In one example, one of the at least one first configuration includes a first RLC bearer configuration (RLC-Bearer-Config), a first MAC cell group configuration (MAC-CellGroupConfig), or a first physical cell group configuration (PhysicalCellGroupConfig). In one example, one of the at least one second configuration includes a second RLC-Bearer-Config, a second MAC-CellGroupConfig, or a second PhysicalCellGroupConfig.

In one example, one of the at least one first configuration includes a first configuration (e.g., RLC configuration, logical channel identity or logical channel configuration) in a RLC-Bearer-Config, a first configuration (e.g., Discontinuous Reception (DRX) configuration, Buffer Status Report (BSR) configuration, scheduling request configuration, Timing Advance Group (TAG) configuration, Power Headroom Report (PHR) configuration, Configured Scheduling (CS) Radio Network Temporary Identity (RNTI) (CS-RNTI), or skip UL transmission dynamic configuration) in a MAC-CellGroupConfig, or a first configuration (e.g., spatial bundling of HARQ ACKs, maximum transmit power, PDSCH HARQ-ACK codebook, RNTI used for SRS transmission power control (TPC) commands on DCI, RNTI used for Physical UL Control Channel (PUCCH) TPC commands on DCI, or RNTI used for PUSCH TPC commands on DCI) in a PhysicalCellGroupConfig. In one example, one of the at least one second configuration includes a second configuration (e.g., RLC configuration, logical channel identity or logical channel configuration) in a RLC-Bearer-Config, a second configuration (e.g., DRX configuration, BSR configuration, scheduling request configuration, TAG configuration, PHR configuration, CS-RNTI, or skip UL dynamic transmission configuration) in a MAC-CellGroupConfig, or a second configuration (e.g., spatial bundling of HARQ ACKs, maximum transmit power, PDSCH HARQ-ACK codebook, RNTI used for SRS TPC commands on DCI, RNTI used for PUCCH TPC commands on DCI or RNTI used for PUSCH TPC commands on DCI) in a PhysicalCellGroupConfig.

In one example, the first DU generates the at least one second configuration or the second CellGroupConfig. In one example, the second DU generates the at least one first configuration or the first CellGroupConfig.

In one example, the UE enters the RCC_INACTIVE from the RCC_CONNECTED in response to (e.g., due to) receiving a first RRC Release (RRCRelease) message from the first or second CU, before transmitting the RRCResumeRequest message. The UE stores (or keeps or maintains) the at least one first configuration in response to the first RRCRelease message.

In one example, the UE enters the RCC_CONNECTED in response to the RRCResume message. The UE stops a cell reselection function in response to the RRCResume message. The UE transmits at least one CQI or at least one CSI to the first DU on a PUCCH, in response to the RRCResume or in response to entering the RCC_CONNECTED. The first DU transmits at least one DCI scheduling PDSCH transmissions according to the least one CQI or the at least one CSI. The UE may transmit the RRCResumeComplete message to the BS in response to the RRCResume message.

Later, the first CU transmits a second RRCRelease message to the UE in the RCC_CONNECTED via the first DU, if the first CU detects that the UE is (e.g., has been) in inactivity for a while. The second RRCRelease message may configure the UE to enter the RCC_INACTIVE or an RRC IDLE state (RRC_IDLE). For the processes 40-70, the UE stores (or keeps or maintains) the at least one second configuration in response to the second RRCRelease message, if (e.g., in the case that) the second RRCRelease message configures the UE to enter the RCC_INACTIVE. For the processes 80-100, the UE stores (or keeps or maintains) the at least one second configuration and the at least one first configuration in response to the second RRCRelease message, if (e.g., in the case that) the second RRCRelease message configures the UE to enter the RCC_INACTIVE.

In one example, the UE in the RCC_CONNECTED transmits a measurement report message to the first CU via the first DU. The first CU may transmit an RRC Reconfiguration message reconfiguring the at least one second configuration or the at least one first configuration, in response to the measurement report.

In one example, the UE stops transmitting the at least one CQI or the at least one CSI to the first DU on the PUCCH, in response to the second RRCRelease message or in response to entering the RCC_INACTIVE.

In one example, the UE activates (or resumes, continues) the cell reselection function upon entering the RCC_INACTIVE or the RRC_IDLE from the RCC_CONNECTED.

In one example, in an alternative embodiment to the processes 40-70, the RRCResume message may not include the (second) full configuration indication, when (e.g., if) the UE releases the at least one first configuration in response to the RRCRelease message configuring the UE to enter the RCC_INACTIVE. In this case, the BS/the first CU/the second CU also releases the at least one first configuration, when (e.g., if) the BS/the first CU/the second CU configures the UE to enter the RCC_INACTIVE. This implies that the at least one second configuration includes full configuration (s), e.g., not a delta configuration compared to the at least one first configuration.

In one example, the first/second DU is an integrated access and backhaul (IAB) node, and the first/second CU is an IAB donor.

It should be noted that although the above examples are illustrated to clarify the related operations of corresponding processes. Message names and IE names described above are examples and should not narrow a scope of the invention.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. The procedure 30 and the processes 40-100 may be compiled into the program codes 214.

To sum up, the present invention provides a method and related communication device for handling an RRC Resume procedure. The UE communicates with the BS according to whether a full configuration indication is received. Thus, the problem regarding the RRC Resume procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station comprising a first Centralized Unit (CU) and a first Distributed Unit (DU) for handling an radio resource control (RRC) Resume procedure, comprising:
   at least one storage device; and
   at least one processing circuit, coupled to the at least one storage device, wherein the at least one storage device stores instructions, and the at least one processing circuit is configured to execute the instructions of:
   the first CU receiving an INITIAL uplink (UL) RRC MESSAGE TRANSFER message from the first DU, wherein the INITIAL UL RRC MESSAGE TRANSFER message comprises an RRC Resume Request message;
   the first CU transmitting a user equipment (UE) CONTEXT SETUP REQUEST message to the first DU in response to the INITIAL UL RRC MESSAGE TRANSFER message, wherein the UE CONTEXT SETUP REQUEST message comprises at least one first configuration;
   the first CU receiving a UE CONTEXT SETUP RESPONSE message for responding to the UE CONTEXT SETUP REQUEST message, from the first DU, wherein the UE CONTEXT SETUP RESPONSE message comprises at least one second configuration and a first full configuration indication;
   the first CU comprising a second full configuration indication in an RRC Resume message according to the first full configuration indication;
   the first CU transmitting the RRC Resume message comprising the at least one second configuration, to a UE via the first DU; and
   the first DU communicating at least one of data and at least one signal with the UE according to the at least one second configuration and not according to the at least one first configuration.

2. The BS of claim 1, wherein the instructions further comprise:
   the first CU transmitting a downlink (DL) RRC MESSAGE TRANSFER message comprising the RRC Resume message to the first DU;
   the first DU transmitting the RRC Resume message to the UE;
   the first DU receiving an RRC Resume Complete message for responding to the RRC Resume message, from the UE; and
   the first DU transmitting a UL RRC MESSAGE TRANSFER message comprising the RRC Resume Complete message to the first CU.

3. The BS of claim 1, wherein the instructions further comprise:
   the first CU receiving the at least one first configuration from a second DU of the BS, before receiving the RRC Resume Request message;
   the first CU determining to configure the UE to enter an RRC INACTIVE state;

the first CU storing the at least one first configuration in response to the determination; and the first CU transmitting a UE CONTEXT RELEASE COMMAND message to the second DU in response to the determination, wherein the second DU releases the at least one first configuration and transmits a UE CONTEXT RELEASE COMPLETE message to the first CU, in response to the UE CONTEXT RELEASE COMMAND message.

4. The BS of claim 1, wherein the at least one first configuration comprises a first cell group configuration, and the at least one second configuration comprises a second cell group configuration.

5. A user equipment (UE) for handling an radio resource control (RRC) Resume procedure, comprising:

at least one storage device; and at least one processing circuit, coupled to the at least one storage device, wherein the at least one storage device stores instructions, and the at least one processing circuit is configured to execute the instructions of:

storing at least one first configuration and transmitting an RRC Resume Request message to a base station (BS);

receiving an RRC Resume message comprising at least one second configuration from the BS;

communicating at least one of data and at least one signal with the BS according to the at least one second configuration and not according to the at least one first configuration, when the RRC Resume message comprises a full configuration indication; and communicating the at least one of the data and the at least one signal with the BS according to the at least one second configuration and the at least one first configuration, when the RRC Resume message does not comprise the full configuration indication.

6. The UE of claim 5, wherein the instructions further comprise:

releasing the at least one first configuration in response to the full configuration indication; and entering an RRC CONNECTED state in response to the RRC Resume message.

7. The UE of claim 5, wherein the instructions further comprise:

entering an RRC INACTIVE state from the RRC CONNECTED state in response to receiving an RRC Release message from the first CU, before transmitting the RRC Resume Request message; and storing the at least one first configuration in response to the RRC Release message.

8. A base station comprising a first Centralized Unit (CU) and a first Distributed Unit (DU) for handling an radio resource control (RRC) Resume procedure, comprising:

at least one storage device; and at least one processing circuit, coupled to the at least one storage device, wherein the at least one storage device stores instructions, and the at least one processing circuit is configured to execute the instructions of:

the first CU receiving an INITIAL uplink (UL) RRC MESSAGE TRANSFER message from the first DU, wherein the INITIAL UL RRC MESSAGE TRANSFER message comprises an RRC Resume Request message;

the first CU transmitting a user equipment (UE) CONTEXT SETUP REQUEST message to the first DU in response to the INITIAL UL RRC MESSAGE TRANSFER message, wherein the UE CONTEXT SETUP REQUEST message comprises at least one first configuration;

the first CU receiving a UE CONTEXT SETUP RESPONSE message for responding to the UE CONTEXT SETUP REQUEST message, from the first DU, wherein the UE CONTEXT SETUP RESPONSE message comprises at least one second configuration;

the first CU transmitting an RRC Resume message comprising the at least one second configuration, to a UE via the first DU; and the first DU communicating at least one of data and at least one signal with the UE according to the at least one first configuration and the at least one second configuration.

9. The BS of claim 8, wherein the instructions further comprise the first CU receiving the at least one first configuration from a second CU of the BS, and the instruction of the first CU receiving the at least one first configuration from the second CU of the BS comprises:

the first CU transmitting a RETRIEVE UE CONTEXT REQUEST message to the second CU in response to the RRC Resume Request message; and the first CU receiving a RETRIEVE UE CONTEXT RESPONSE message for responding to the RETRIEVE UE CONTEXT REQUEST message from the second CU, wherein the RETRIEVE UE CONTEXT RESPONSE message comprises the at least one first configuration.

* * * * *